(12) United States Patent
Wang et al.

(10) Patent No.: US 10,021,284 B2
(45) Date of Patent: Jul. 10, 2018

(54) EPIPOLAR PLANE SINGLE-PULSE INDIRECT TOF IMAGING FOR AUTOMOTIVES

(71) Applicant: Samsung Electronics Co., Ltd., Suwon-si, Gyeonggi-do (KR)

(72) Inventors: Yibing Michelle Wang, Temple City, CA (US); Ilia Ovsiannikov, Studio City, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 118 days.

(21) Appl. No.: 14/960,339

(22) Filed: Dec. 4, 2015

(65) Prior Publication Data

US 2017/0064235 A1    Mar. 2, 2017

Related U.S. Application Data

(60) Provisional application No. 62/210,952, filed on Aug. 27, 2015.

(51) Int. Cl.
| | |
|---|---|
| *H04N 5/225* | (2006.01) |
| *G06T 7/00* | (2017.01) |
| *H04N 5/222* | (2006.01) |
| *G01S 7/00* | (2006.01) |
| *H04N 5/374* | (2011.01) |

(Continued)

(52) U.S. Cl.
CPC ............ *H04N 5/2256* (2013.01); *G01S 7/00* (2013.01); *G06T 7/0051* (2013.01); *H04N 5/2226* (2013.01); *H04N 5/3745* (2013.01); *H04N 13/0253* (2013.01); *H04N 13/0271* (2013.01)

(58) Field of Classification Search
CPC ............. H04N 5/2256; H04N 13/0271; H04N 5/3745; H04N 13/0253; H04N 5/2226; G01S 7/00; G01S 17/08–17/36; G06T 7/0051
See application file for complete search history.

(56) References Cited

U.S. PATENT DOCUMENTS

| | | | | |
|---|---|---|---|---|
| 2004/0021057 A1* | 2/2004 | Drowley | ................. | G01S 17/36 250/208.1 |
| 2007/0158533 A1* | 7/2007 | Bamji | .................... | H04N 5/335 250/208.1 |

(Continued)

FOREIGN PATENT DOCUMENTS

WO        2015097284 A1    7/2015

*Primary Examiner* — Jason A Flohre
(74) *Attorney, Agent, or Firm* — Renaissance IP Law Group LLP (57) ABSTRACT

A method and a system are disclosed for detecting a depth of an object illuminated by at least one first light pulse. Detection of light reflected from the object illuminated by the at least one first light pulse by a first row of pixels of 2D pixel array is enabled for a first predetermined period of time in which the first row of pixels forms an epipolar line of a scanning line of a first light pulse. Enabling of the detection by the first row of pixels for the first predetermined period of time occurs a second predetermined period of time after a beginning of a pulse cycle T of the at least one first light pulse. Detection signals are generated corresponding to the detected light reflected from the object, and the generated detection signals are used to determine a depth of the object.

17 Claims, 8 Drawing Sheets

(51) Int. Cl.
*H04N 13/00* (2018.01)
*H04N 5/3745* (2011.01)
*H04N 13/02* (2006.01)

(56) References Cited

U.S. PATENT DOCUMENTS

| | | | | |
|---|---|---|---|---|
| 2010/0231774 | A1* | 9/2010 | Tashiro | H04N 5/378 348/311 |
| 2010/0303299 | A1* | 12/2010 | Cho | G01B 11/026 382/106 |
| 2012/0062705 | A1* | 3/2012 | Ovsiannikov | G01S 7/4915 348/46 |
| 2012/0133737 | A1* | 5/2012 | Min | H04N 13/0207 348/46 |
| 2012/0268727 | A1* | 10/2012 | Schrey | G01S 7/487 356/5.01 |
| 2013/0235160 | A1 | 9/2013 | Cohen et al. | |
| 2014/0002636 | A1* | 1/2014 | Lee | G01C 3/08 348/135 |
| 2015/0062558 | A1 | 3/2015 | Koppal et al. | |
| 2015/0285618 | A1* | 10/2015 | Haraguchi | H04N 5/2354 348/135 |
| 2017/0150077 | A1* | 5/2017 | Matsuo | H04N 5/361 |

\* cited by examiner

EPIPOLAR PLANE SINGLE-PULSE INDIRECT TOF IMAGING FOR AUTOMOTIVES

CROSS-REFERENCE TO RELATED APPLICATION

This patent application claims the priority benefit under 35 U.S.C. § 119(e) of U.S. Provisional Patent Application No. 62/210,952 filed on Aug. 27, 2015, and the disclosure of which is incorporated herein by reference in its entirety.

TECHNICAL FIELD

The present disclosure generally relates to image sensors. More specifically, and not by way of limitation, particular embodiments disclosed herein are directed to a time-of-flight (TOF) system and method of depth measurements on a three-dimensional (3D) object within a field of view of the TOF system.

BACKGROUND

Three-dimensional (3D) imaging systems are increasingly being used in a wide variety of applications, such as automotive, industrial production, video games, computer graphics, robotic surgeries, consumer displays, surveillance videos, 3D modeling, real estate sales, and so on.

In a Time of Flight (TOF) 3D imaging system, distance to a 3D object is resolved based on the known speed of light by measuring the round-trip time it takes for a light signal to travel between a camera and the 3D object for each point of the image. Some exemplary applications of the TOF method may include advanced automotive applications, such as active pedestrian safety or pre-crash detection based on distance images in real time; tracking movements of humans, such as during interaction with games on video-game consoles; industrial machine vision to classify objects and help robots find the items, such as items on a conveyor belt, and so on.

SUMMARY

One exemplary embodiment provides a method of detecting an image, comprising: enabling for a first predetermined period of time detection of light reflected from at least one object illuminated by at least one first light pulse by a first row of pixels of a two-dimensional (2D) pixel array, the first row of pixels forming an epipolar line of a scan line of the at least one first light pulse, the at least one first light pulse comprising a pulse cycle T, the enabling of detection by the first row of pixels for the first predetermined period of time occurring a second predetermined period of time after a beginning of the pulse cycle T of the at least one first light pulse, and the first period of time being substantially equal to the first pulse cycle T; and enabling for the first predetermined period of time detection of light reflected from the at least one object illuminated by at least one second light pulse by a second row of pixels of the 2D pixel array, the second row of pixels forming an epipolar line of a scan line of the at least one second light pulse, the second row of pixels being different from the first row of pixels, the at least one second light pulse comprising the pulse cycle T, and the enabling of detection by the second row of pixels for the first predetermined period of time occurring the second predetermined period of time after a beginning of the pulse cycle T of the at least one second light pulse.

One exemplary embodiment provides an image sensor unit comprising a two-dimensional (2D) pixel array and a controller. The 2D pixel array comprises a plurality of rows of pixels. The controller is to enable for a first predetermined period of time detection of light reflected from of at least one object illuminated by at least one first light pulse at a first row of pixels of the 2D pixel array in which the first row of pixels forms an epipolar line of a scanning line of the at least one first light pulse, the at least one first light pulse comprises a pulse cycle T, the enabling of the detection by the first row of pixels for the first predetermined period of time occurs a second predetermined period of time after a beginning of the pulse cycle T of the at least one first light pulse, and the first period of time is substantially equal to the first pulse cycle T. The controller is also to enable for the first predetermined period of time detection of light reflected from the at least one object illuminated by at least one second light pulse by a second row of pixels of the 2D pixel array in which the second row of pixels form an epipolar line of a scanning line of the at least one second light pulse, the second row of pixels is different from the first row of pixels, the at least one second light pulse comprises the pulse cycle T, and the enabling of detection by the second row of pixels for the first predetermined period of time occurs the second predetermined period of time after a beginning of the pulse cycle T of the at least one second light pulse.

One exemplary embodiment provides an image sensor unit, comprising a two-dimensional (2D) pixel array and a controller. The 2D pixel array comprises a plurality of rows of pixels. The controller is to enable for a first predetermined period of time detection of light reflected from of at least one object illuminated by at least one first light pulse at a first row of pixels of the 2D pixel array in which the first row of pixels form an epipolar line of a scan line of the at least one first light pulse, the at least one first light pulse comprises a pulse cycle T, the enabling of the detection by the first row of pixels for the first predetermined period of time occurs a second predetermined period of time after a beginning of the pulse cycle T of the at least one first light pulse, the first period of time is substantially equal to the first pulse cycle T. The controller is also to enable generation of phase signals corresponding to the detected light reflected from the at least one object illuminated by the at least one first light pulse.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein. Additionally, the described aspects can be implemented to perform 3D-depth measurements in any imaging device or system, including, for example, a vehicle, a smartphone, a User Equipment (UE), a laptop computer, and the like. Moreover, the 3D-depth measurements made in accordance with embodiments disclosed herein may provide automotive applications comprising improved vision for drivers under difficult conditions, such as low light, bad weather, strong ambient light, etc.

Reference throughout this specification to "one embodiment" or "an embodiment" means that a particular feature, structure, or characteristic described in connection with the embodiment is included in at least one embodiment disclosed herein. Thus, the appearances of the phrases "in one embodiment" or "in an embodiment" or "according to one embodiment" (or other phrases having similar import) in various places throughout this specification are not necessarily all referring to the same embodiment. As used herein, the word "exemplary" means "serving as an example, instance, or illustration." Any embodiment described herein as "exemplary" is not to be construed as necessarily preferred or advantageous over other embodiments. Furthermore, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

It is noted at the outset that the terms "coupled," "operatively coupled," "connected," "connecting," "electrically connected," etc., may be used interchangeably herein to generally refer to the condition of being electrically/electronically connected in an operative manner. Similarly, a first entity is considered to be in "communication" with a second entity (or entities) if the first entity electrically sends and/or receives (whether through wireline or wireless means) information signals (whether containing address, data, or control information) to/from the second entity regardless of the type (analog or digital) of those signals. It is further noted that various figures (including component diagrams) shown and discussed herein are for illustrative purpose only, and are not drawn to scale. Similarly, various waveforms and timing diagrams are shown for illustrative purpose only.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

As used herein, the term "module" refers to any combination of software, firmware and/or hardware configured to provide the functionality described herein. The software may be embodied as a software package, code and/or instruction set or instructions, and "hardware," as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 1:
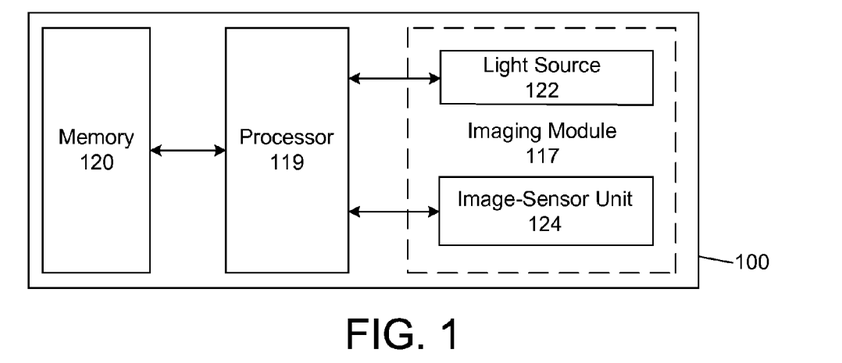
FIG. 1 shows a highly simplified, partial configuration of an epipolar-plane, single-pulse, indirect Time-of-Flight (TOF) imaging system according to one exemplary embodiment disclosed herein.

FIG. 1 shows a highly simplified, partial configuration of an epipolar-plane, single-pulse, indirect Time-of-Flight (TOF) imaging system 100 according to one exemplary embodiment disclosed herein. As shown, the system 100 may include an imaging module 117 coupled to and in communication with a processor or host 119. The system 100 may also include a memory module 120 coupled to the processor 119 to store information content such as, but not limited to, image data received from the imaging module 117. In particular embodiments, the entire system 100 may be encapsulated in a single Integrated Circuit (IC) or chip. Alternatively, one or more of the modules 117, 119 and 120 may be implemented in a separate chip. Furthermore, the memory module 120 may include more than one memory chip, and the processor module 119 may comprise of multiple processing chips as well. In any event, the details about packaging of the modules in FIG. 1 and how the modules are fabricated or implemented, whether in a single chip or using multiple discrete chips, are not relevant to the present discussion and, hence, such details are not provided herein.

The system 100 may be any low-power electronic device configured for 3D-camera applications as per the subject matter disclosed herein. The system 100 may be non-portable or portable. Some examples of the non-portable version of the system 100 may include, but are not limited to, a vehicle such as an automobile or a truck, an aircraft, an air-borne platform, a watercraft, a rail-guided vehicle, a driver-side mounted camera in a vehicle (for example, to monitor whether the driver is awake or not), a game console in a video arcade, an interactive video terminal, a machine vision system, an industrial robot, a VR equipment, and so on. Some examples of the portable version of the system 100 may include, but are not limited to, popular consumer electronic gadgets such as a mobile device, a cellphone, a smartphone, a User Equipment (UE), a tablet, a digital camera, a laptop or desktop computer, an electronic smartwatch, a Machine-to-Machine (M2M) communication unit, a Virtual Reality (VR) equipment or module, a robot, and the like. The 3D-imaging functionality provided as per the subject matter disclosed herein may be used in many applications such as, but not limited to, vehicular applications, such as autonomous driving and/or navigation applications, autonomous safety applications, virtual reality applications on a virtual reality equipment, online chatting/gaming, 3D texting, searching an online or local (device-based) catalog/database using a 3D image of a product to obtain information related to the product (for example, calorie content of a piece of food item), robotics and machine vision applications, and the like.

In particular embodiments disclosed herein, the imaging module 117 may include a light source 122 and an image-sensor unit 124. As discussed in more detail with reference to FIG. 2 below, in one embodiment, the light source 122 may be a Short Wave Infrared (SWIR) laser. In other embodiments, the light source may be a Near Infrared (NIR) laser. The image-sensor unit 124 may include a pixel array and ancillary processing circuits, as shown in FIG. 2 and also discussed below.

In one embodiment, the processor 119 may be a CPU, which can be a general-purpose microprocessor. In the discussion herein, the terms "processor" and "CPU" may be used interchangeably for ease of discussion. It is, however, understood that, instead of or in addition to the CPU, the processor 119 may contain any other type of processor such as, but not limited to, a microcontroller, a Digital Signal Processor (DSP), a Graphics Processing Unit (GPU), a dedicated Application Specific Integrated Circuit (ASIC) processor, and the like. Furthermore, in one embodiment, the processor/host 119 may include more than one CPU, which may be operative in a distributed processing environment. The processor 119 may be configured to execute instructions and to process data according to a particular Instruction Set Architecture (ISA) such as, but not limited to, an x86 instruction set architecture (32-bit or 64-bit versions), a PowerPC® ISA, or a MIPS (Microprocessor without Interlocked Pipeline Stages) instruction set architecture relying on RISC (Reduced Instruction Set Computer) ISA. In one embodiment, the processor 119 may be a System on Chip (SoC) having functionalities in addition to a CPU functionality.

In particular embodiments, the memory module 120 may be a Dynamic Random Access Memory (DRAM) such as, but not limited to, a Synchronous DRAM (SDRAM), or a DRAM-based Three-Dimensional Stack (3DS) memory module such as, but not limited to, a High Bandwidth Memory (HBM) module, or a Hybrid Memory Cube (HMC) memory module. In other embodiments, the memory module 120 may be a Solid-State Drive (SSD), a non-3DS DRAM module, or any other semiconductor-based storage system such as, but not limited to, a Static Random Access Memory (SRAM), a Phase-Change Random Access Memory (PRAM or PCRAM), a Resistive Random Access Memory (RRAM or ReRAM), a Conductive-Bridging RAM (CBRAM), a Magnetic RAM (MRAM), a Spin-Transfer Torque MRAM (STT-MRAM), and the like.

Figure 2:
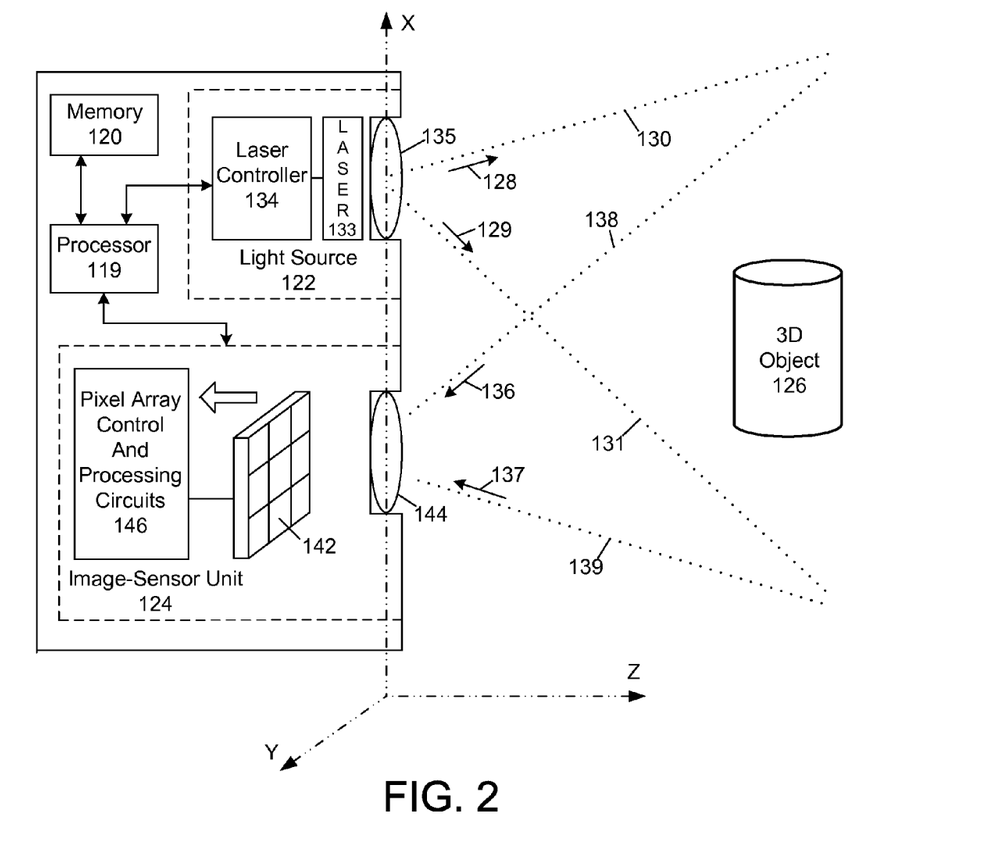
FIG. 2 depicts an exemplary operational configuration of the system in FIG. 1 according to one embodiment disclosed herein.

FIG. 2 depicts an exemplary operational configuration of the system 100 in FIG. 1 according to one embodiment disclosed herein. The system 100 may be used to obtain depth (or range) information (along the Z-axis) for a 3D object, such as the 3D object 126. Although only one 3D object 126 is depicted in FIG. 2, it should be understood that 3D object 126 may represent one or more objects within the field of view of system 100. In one embodiment, the depth (or range) information may be determined by the processor 119 based on the scan data received from the image-sensor unit 124. In another embodiment, the depth information may be determined by the image-sensor unit 124. In particular embodiments, the depth information may be used by the processor 119 for automotive driving, navigation and/or safety applications and/or may be communicated to one or more other systems configured to use the depth information. In other embodiments, the depth information may be used by the processor 119 as part of a 3D user interface to enable the user of the system 100 to interact with a 3D image of one or more objects in the field of view of system 100 or use the 3D image of the object as part of a game or another application running on the system 100. The 3D imaging as per the subject matter disclosed herein may be used for other purposes or applications as well, and may be applied to substantially any scene or 3D objects.

In FIG. 2, the X-axis is taken to be the horizontal direction along the front of the device 100, the Y-axis is the vertical direction (out of the page in this view), and the Z-axis extends away from the device 100 in the general direction of the object 126 being imaged. For the depth measurements, the optical axes of the modules 122 and 124 may be parallel to the Z-axis. Other alternative optical arrangements may be used as well to implement the principles described herein, and the alternative arrangements are considered to be within the scope of the subject matter disclosed herein.

The light-source module 122 may illuminate the 3D object 126, as shown by exemplary arrows 128 and 129 associated with corresponding dotted lines 130 and 131 generally representing an illumination path of a light beam or optical radiation that may be used to line scan the 3D object 126 within an optical field of view. In one embodiment, a line-by-line scan of the object surface may be performed using an optical-radiation source, which, in one embodiment, may be a laser-light source 133 operated and controlled by a laser controller 134.

A light beam from the laser source (or illumination source) 133 may be line scanned, under the control of the laser controller 134, in the Y direction across the surface(s) of the 3D object 126 within the field of view of the projection optics 135. The line scan may project single-pulse light that has been formed into a horizontal sheet or line of light (in the X-axis direction) on the surface of the 3D object. The projection optics 135 may comprise a focusing lens, a glass/plastics surface, or other cylindrical optical element that directs a single-pulse laser beam from the laser source 133 as a line of light onto the surface(s) of one or more objects within the field of view of the projection optics 135. In the embodiment of FIG. 2, a convex structure is shown as a focusing lens 135. Any other suitable lens design may, however, be selected for projection optics 135. In one embodiment, projection optics 135 may comprise a laser line generator lens. An object 126 may be located at a focusing location where illuminating light from the laser source 133 is directed by the projection optics 135. Thus, the surface of the 3D object 126 may be illuminated by the light beam being directed from the projection optics 135.

In particular embodiments, the laser source 133 may comprise one or several laser diodes or one or several Light Emitting Diodes (LED) emitting near infrared (NIR) light or short wave infrared (SWIR) light, or any other type of laser light source. In one embodiment, the laser source 133 may be fixed in one position within the housing of the device 100. In another embodiment, the laser source 133 may be X-Y addressable (for example, by the laser controller 134) to vary the field of view of system 100. The laser light illumination from the laser source 133 may be projected onto the surface of the 3D object 126 using a mirror (not shown), and/or the line scan may be completely mirrorless. In particular embodiments, the light-source module 122 may include more or less components than those depicted in the exemplary embodiment of FIG. 2.

In the embodiment of FIG. 2, the light reflected from the illuminated object 126 may travel along a collection path generally indicated by arrows 136 and 137 and corresponding dotted lines 138 and 139. The light collection path may carry photons reflected from or scattered by the surface of the object 126 upon receiving illumination from the laser source 133. It is noted here that the depiction of various propagation paths using solid arrows and dotted lines in FIG. 2 is for illustrative purpose only and the depiction should not be construed to illustrate any actual optical signal propagation paths. In practice, the illumination and collection signal paths may be different from those shown in FIG. 2, and may not be as clearly-defined as in the illustration in FIG. 2.

The light received from an illuminated object 126 may be focused onto one or more rows of pixels of a 2D pixel array 142 via collection optics 144 in the image-sensor unit 124. Similar to the projection optics 135, the collection optics 144 may be a focusing lens, a glass/plastics surface, or other cylindrical optical element that concentrates the reflected light received from an object 126 onto one or more rows of pixels in the 2D array 142. In the embodiment of FIG. 2, a convex structure is shown as a focusing lens 144. Any other suitable lens design may, however, be selected for collection optics 144. Furthermore, for ease of illustration, only a 3×3 pixel array is depicted in FIG. 2. It is understood, however, that modern pixel arrays contain thousands or even millions of pixels. The pixel array 142 may be an RGB pixel array in which different pixels may collect light signals of different colors. As mentioned before, in particular embodiments, the pixel array 142 may be any 2D sensor, such as a 2D SWIR sensor, a 2D NIR sensor, and the like.

Figure 8:
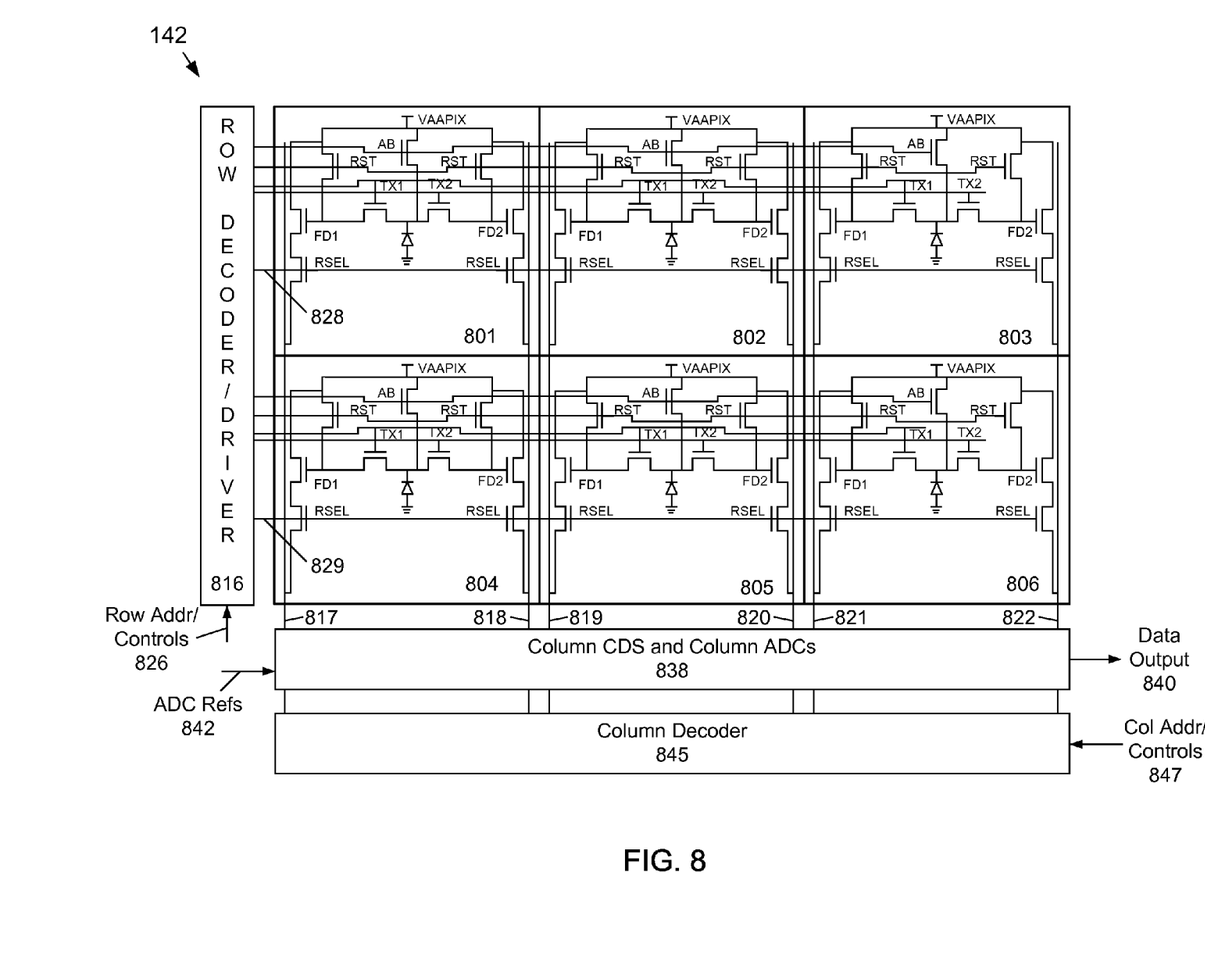
FIG. 8 shows exemplary circuit details of a 2D pixel array and a portion of the associated processing circuits in an image processing unit of the image sensor in FIGS. 1 and 2 according to one exemplary embodiment disclosed herein.

The pixel array 142 may convert the received photons into corresponding electrical signals, which are then processed by the image processing unit 146 to determine a 3D-depth image of the object 126. In one embodiment, the image processing unit 146 may use an indirect technique for depth (or range) measurements. An exemplary single-pulse, indirect TOF technique is discussed later with reference to FIG. 3. The image processing unit 146 may also include relevant circuits for controlling the operation of the pixel array 142. Exemplary image processing and control circuits are illustrated in FIG. 8, which is discussed below.

The processor 119 may control the operations of the light-source module 122 and the image-sensor unit 124. In one embodiment, system 100 may operate in a 3D-imaging mode among other possible imaging modes. In the 3D-imaging mode, the processor 119 may activate both of the modules 122 and 124.

The processed image data received from the image processing unit 146 may be stored by the processor 119 in the memory 120. The processor 119 may also display a 3D image on a display screen (not shown) of the device 100. The processor 119 may be programmed in software or firmware to carry out various processing tasks described herein. Alternatively or additionally, the processor 119 may comprise programmable hardware logic circuits for carrying out some or all of the functions of processor 119. In particular embodiments, the memory 120 may store program code, look-up tables and/or interim computational results to enable the processor 119 to carry out the functions of processor 119.

Figure 3:
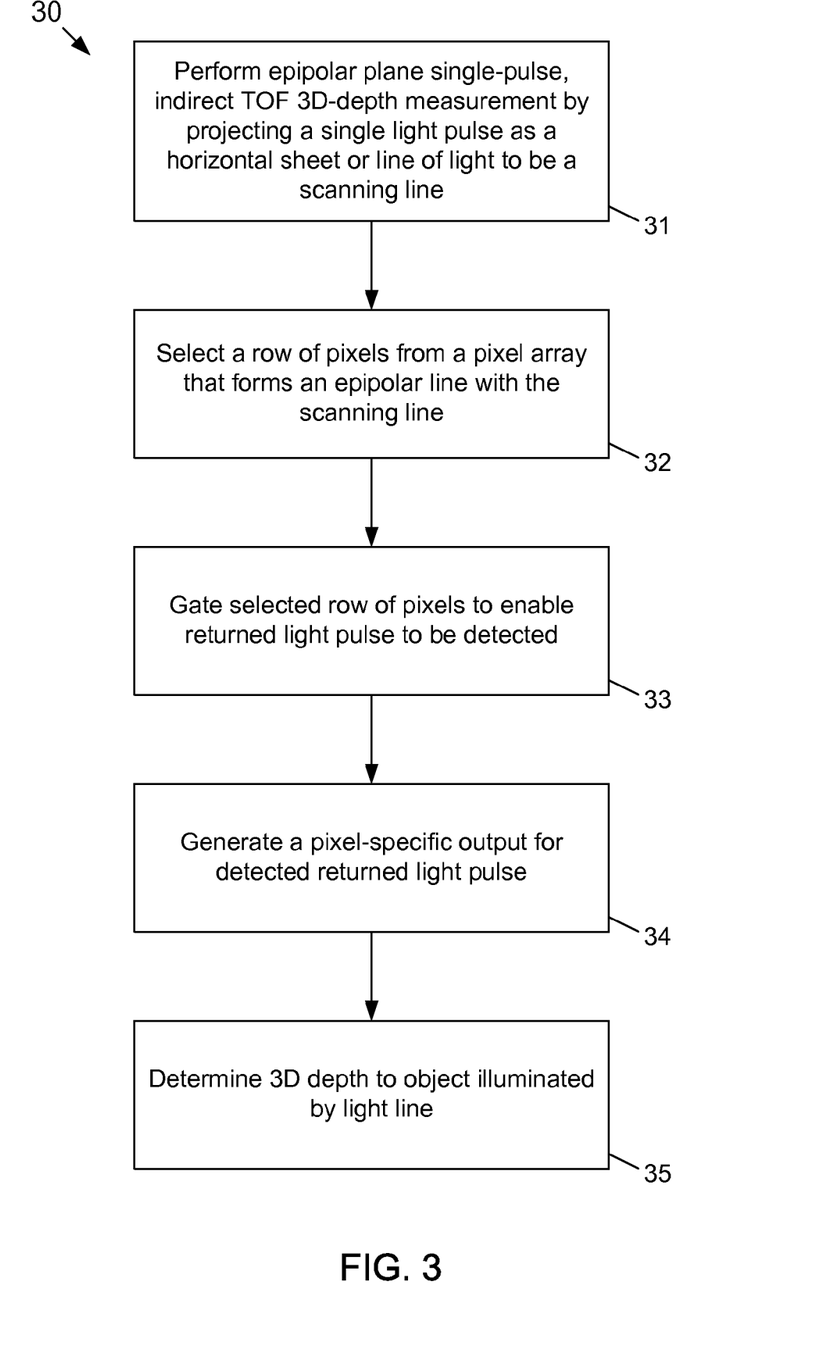
FIG. 3 depicts a flowchart of an exemplary process for making epipolar-plane, single-pulse, indirect TOF 3D-depth measurements according to one exemplary embodiment disclosed herein.

FIG. 3 depicts a flowchart of an exemplary process 30 for making epipolar-plane, single-pulse, indirect TOF 3D-depth measurements according to one exemplary embodiment disclosed herein. Various operations illustrated in FIG. 3 may be performed by a single module, a combination of modules and/or system components in the system 100. In the discussion herein, by way of an example only, specific tasks are described as being performed by specific modules or system components. Other modules or system components may be suitably configured to perform such tasks as well.

In FIG. 3, at block 31, the system 100 (more specifically, the processor 119) may perform an epipolar-plane, single-pulse, indirect TOF 3D-depth measurement of one or more 3D objects within the field of view of system 100, such as the single object 126 depicted in FIG. 2, using a light source, such as the light-source module 122 in FIG. 2. As part of the 3D-depth measurement, the light-source module 122 may be configured, for example, by the processor 119 to project a single light pulse that has been formed into a horizontal sheet or line of light on a surface of the 3D object 126. At block 32, the pixel processing unit 146 in the system 100 may select a row of pixels in an image sensor, such as the 2D pixel array 142 in FIG. 2. The image sensor 142 comprises a plurality of pixels arranged in a 2D array forming an image plane, and the selected row of pixels forms an epipolar line of a scanning line (block 31) on the image plane that corresponds to an illuminated line (light line) on the surface of the 3D object 126. At block 33, the selected row of pixels is gated to enable the selected row to detect a returned light pulse. The light pulse returned, or reflected, from an illuminated light line (or scanning line) may be detected by a single row of pixels or by more than one row of pixels if, for example, the light reflected from the illuminated line becomes focused by the collection optics 144 onto one or more adjacent rows of pixels. On the other hand, it may be possible that light reflected from one or more light rows may be collected at a single row of pixels in the 2D array 142. At block 34, the image processing unit 146, as suitably configured by the processor 119, may generate a pixel-specific output in response to a row-specific detection (at block 33) of a corresponding light line. At block 35, the image processing unit 146 may determine the 3D depth (or range) to an object illuminated by the light line based on, for example, the pixel-specific output (at block 34) and a scan angle used by the light source for projecting the corresponding light line (at block 31). The depth measurement for an epipolar-plane, single-pulse, indirect TOF 3D-depth measurement is discussed in more detail with reference to FIG. 4.

Figure 4:
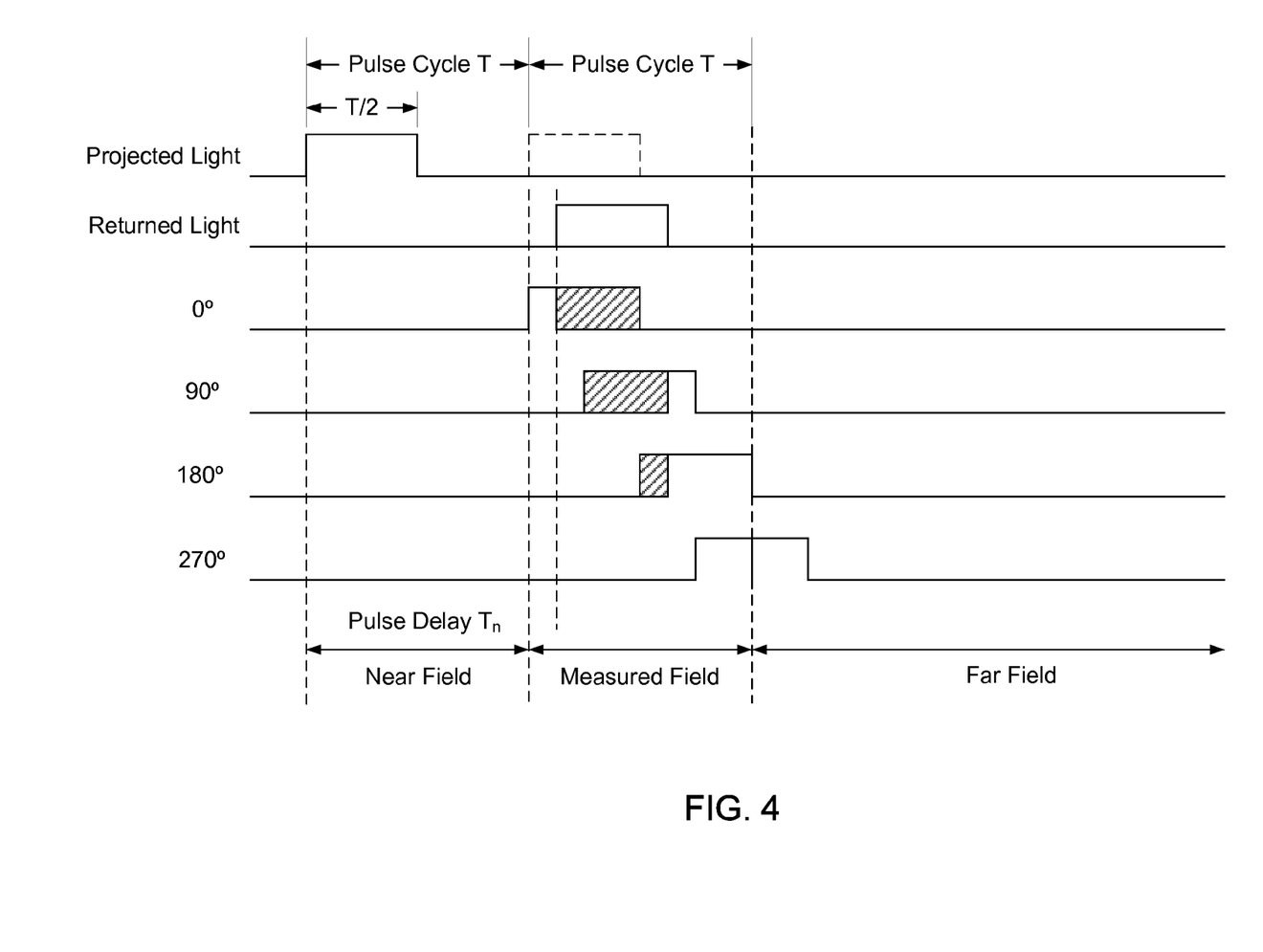
FIG. 4 depicts a waveform timing diagram of a gated single-pulse, indirect TOF technique according to the subject matter disclosed herein.

FIG. 4 depicts a waveform timing diagram of a gated single-pulse, indirect TOF technique according to the subject matter disclosed herein.

In FIG. 4, the top waveform is a Projected Light waveform that comprises a single light pulse having an "on" time of T/2 and a pulse cycle of T. The Returned Light waveform comprises a single light pulse waveform that has been reflected off of a surface of an object (not shown). The single Returned Light pulse waveform corresponds to the single Projected Light pulse waveform and is shifted later in time to represent, by way of example, the time to propagate to the surface of the object, be reflected off of the surface of the object and be returned as a Returned Light pulse. As depicted in FIG. 4, the Returned Light pulse waveform occurs during the pulse cycle immediately after the initial pulse cycle, by way of example. In general, the Returned Light pulse waveform could occur during an integer number of pulse cycles T after the beginning of the Projected Light pulse waveform depending on the depth (or range) of the surface from which the Returned Light pulse is reflected.

According to the subject matter disclosed herein, the demodulation signals are enabled, or gated, to be active during a Measured Field time period to measure a fine depth of the surface of an object. The length of the Measured Field time period corresponds to the pulse cycle T. That is, the length of the Measured Field time period is substantially equal to the pulse cycle T. The Measured Field is selected to occur when the Returned Light pulse is received. That is, the time period indicated in FIG. 4 as the Near Field can be selectively varied to ignore reflections that may be received during the Near Field time period and/or to determine a coarse depth (or range) of an object from system 100. The Measured Field is selected to occur at the end of the selectably variable Near Field time period. Light reflection signals received during a Far Field period of time that occurs after the Measured Field are also ignored.

The cycle time T of the Projected Light pulse can also be varied to vary a resolution of a fine depth measurement that is made during the Measured Field period of time because the length of the Measured Field directly corresponds to the pulse cycle T. That is, a relatively shorter cycle time T corresponds to a relatively higher resolution fine depth measurement, and a relatively longer cycle time T corresponds to a relatively lower resolution fine depth measurement.

A row of pixels of a pixel array that forms an epipolar line corresponding to the scanning line of the Projected Light pulse may be enabled (gated) during the Measured Field time period to detect the Returned Light pulse. The demodulation signals are also enabled (or gated) during the Measured Field time period to generate the signals $S_0$, $S_{90}$, $S_{180}$ and $S_{270}$. In this manner, the depth (or range) D determined by, for example, Equation (1) becomes a fine depth measurement that is added to the coarse depth (based on the Near Field period of time) to determine the depth (or range) to the surface of the object. That is, the fine depth (or range) D determined by, for example, Equation (1) is added to the coarse depth determined by the length of time of the Near Field to determine the overall depth (or range) to the surface of the object.

The depth measurement is robust because reflection signals (i.e., multipath reflections) that may be received during the Near Field and Far Field time periods are ignored. Additionally, because only a row forming an epipolar line for a scanning line is enabled, reflection signals that are received outside of the enabled row are also ignored, thereby further providing a robust depth measurement. Thus, the subject matter disclosed herein may be used to make depth measurements in foggy or rainy weather conditions.

Although the present discussion describes only one row being enabled, it should be understood if the system is configured to have multiple rows that form an epipolar line of a scanning line, then the rows forming the epipolar line are enabled. It should also be understood that although only four demodulation signals are depicted in FIG. 4, any number of demodulation signals could be used. In this regard, an increase in the number of demodulation signals would correspondingly increase the phase resolution for a given pulse cycle T and, therefore, the resolution of the determined fine depth (or range) of an object and the overall depth (or range) to the object.

Figure 5A:
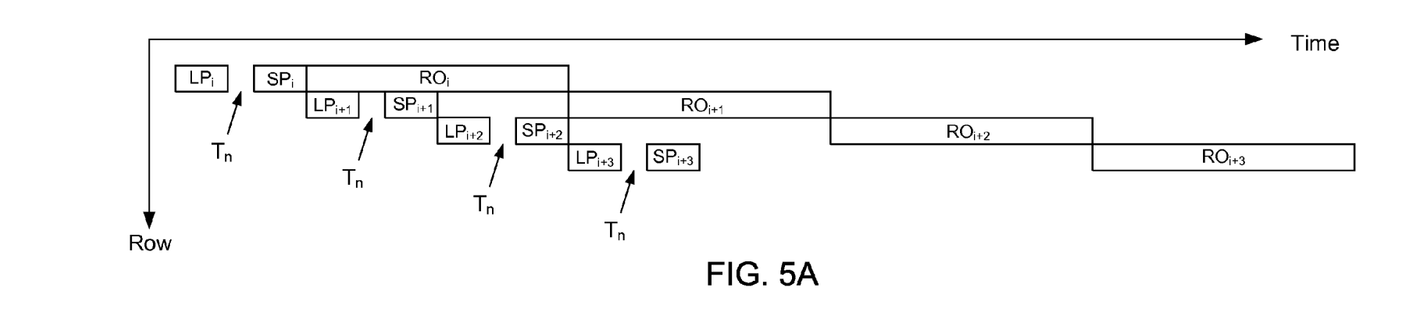
FIG. 5A depicts a portion of one embodiment of a general timing sequence for capturing (or detecting) image information using a gated single-pulse indirect TOF technique according to the subject matter disclosed herein.

FIG. 5A depicts a portion of one embodiment of a general timing sequence for capturing (or detecting) image information using a gated single-pulse, indirect TOF technique according to the subject matter disclosed herein. In FIG. 5A, the horizontal axis represents time and the vertical axis represents rows of a 2D pixel array, such as 2D pixel array 142 in FIG. 2. A row i that forms an epipolar line of a scanning line of a light pulse LP, is horizontally aligned with the light pulse in FIG. 5A.

As depicted in FIG. 5A, a shutter period (SP) occurs a pulse delay $T_n$ after a light pulse (LP). The pulse delay $T_n$ represents a selectably variable time period corresponding to the Near Field shown in FIG. 4. A shutter period (SP) represents a time period (1) during which the row i forming an epipolar line for a corresponding light pulse is gated (enabled) to detect a Returning Light pulse and (2) during which demodulation signals are used to generate signals $S_0$, $S_{90}$, $S_{180}$ and $S_{270}$. A read-out (RO) period begins after a shutter period (SP) ends during which time the detected image information detected by the row is output. For the first row i, the read-out period ($RO_1$) begins immediately after the first shutter period ($SP_1$). For subsequent rows, the read-out period begins after the previous read out period ends.

The timing sequence depicted in FIG. 5A relates to a system in which light pulses LPs are projected immediately after a corresponding shutter period ends. It should be understood, however, that there may be a delay between the end of a current shutter period and the beginning of the next light pulse. Also as can be seen in FIG. 5A, frame rate is mainly determined by the time associated with the read-out periods, which accounts for most of the time needed to obtain the image information. Although the timing sequence of FIG. 5A depicts only four rows of image information, it should be understood that the timing sequence depicted by FIG. 5A may comprise any number of rows of image information.

Although FIG. 5A depicts a single row associated with a single light pulse, it should be understood that one or more rows may be gated depending on the optical configuration of the system (i.e., how many rows of pixels form an epipolar line for a scanning line). Additionally, it should be understood that the depicted row sequence need not be sequential with respect to adjacent rows in the pixel array, that is, the row sequence depicted in FIG. 5A can be in any order.

Figure 5B:
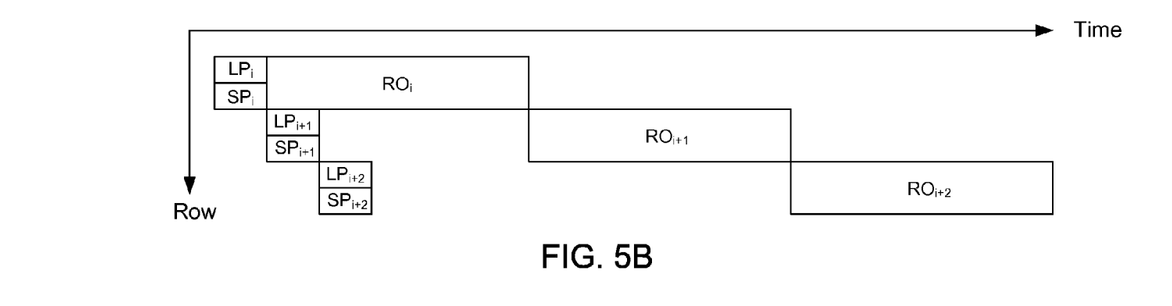
FIG. 5B depicts a portion of one embodiment of a timing sequence for capturing (or detecting) image information using a gated single-pulse, indirect TOF technique in which pulse delay $T_n$ is selected to zero (i.e., no Near Field) according to the subject matter disclosed herein.

FIG. 5B depicts a portion of one embodiment of a timing sequence for capturing (or detecting) image information using a gated single-pulse, indirect TOF technique in which pulse delay $T_n$ is selected to zero (i.e., no Near Field) according to the subject matter disclosed herein. In FIG. 5B, a shutter period is depicted being vertically adjacent to a light pulse because the shutter pulse SP and the light pulse are simultaneous for situations in which the pulse delay $T_n$ is selected to zero. It should be noted in FIG. 5B that the read-out period for a first row begins at the end of the corresponding shutter period, whereas subsequent read-out periods begin after the previous read-out period ends. Although FIG. 5B depicts only three rows of image information being captured, any number of rows of image information may be captured in which pulse delay $T_n$ is selected to zero (i.e., no near field). Although the timing sequence of FIG. 5B depicts only three rows of image information, it should be understood that the timing sequence depicted by FIG. 5B may comprise any number of rows of image information.

Figure 5C:
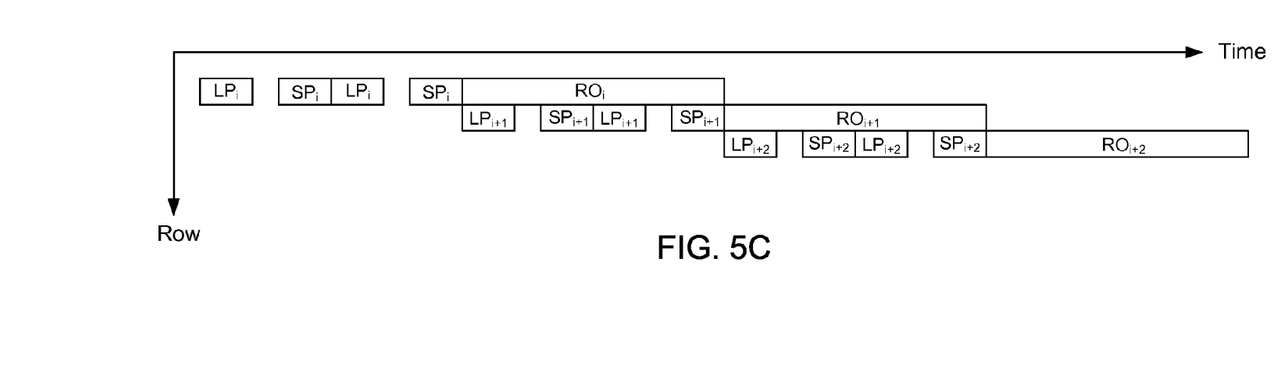
FIG. 5C depicts a portion of one embodiment of a timing sequence for capturing image information using a gated single-pulse, indirect TOF technique in which pulse delay $T_n$ is selected to be nonzero and two light pulses per row are projected and detected according to the subject matter disclosed herein.

FIG. 5C depicts a portion of one embodiment of a timing sequence for capturing image information using a gated single-pulse, indirect TOF technique in which pulse delay $T_n$ is selected to be nonzero and two light pulses per row are projected and detected according to the subject matter disclosed herein. The two light pulses per row that are projected and detected provide an increased signal to noise ratio (SNR) of the detected signal. It should be understood that even though FIG. 5C depicts two pulses per row; any number of light pulses per row may be projected and detected to increase the SNR. Although the timing sequence of FIG. 5C depicts only three rows of image information, it should be understood that the timing sequence depicted by FIG. 5C may comprise any number of rows of image information. Additionally, more than two light pulses per row that are projected and detected could be used. Thus, it should be understood that the subject matter disclosed herein could be used with one or more light pulses per row that are projected and detected.

Figure 6:
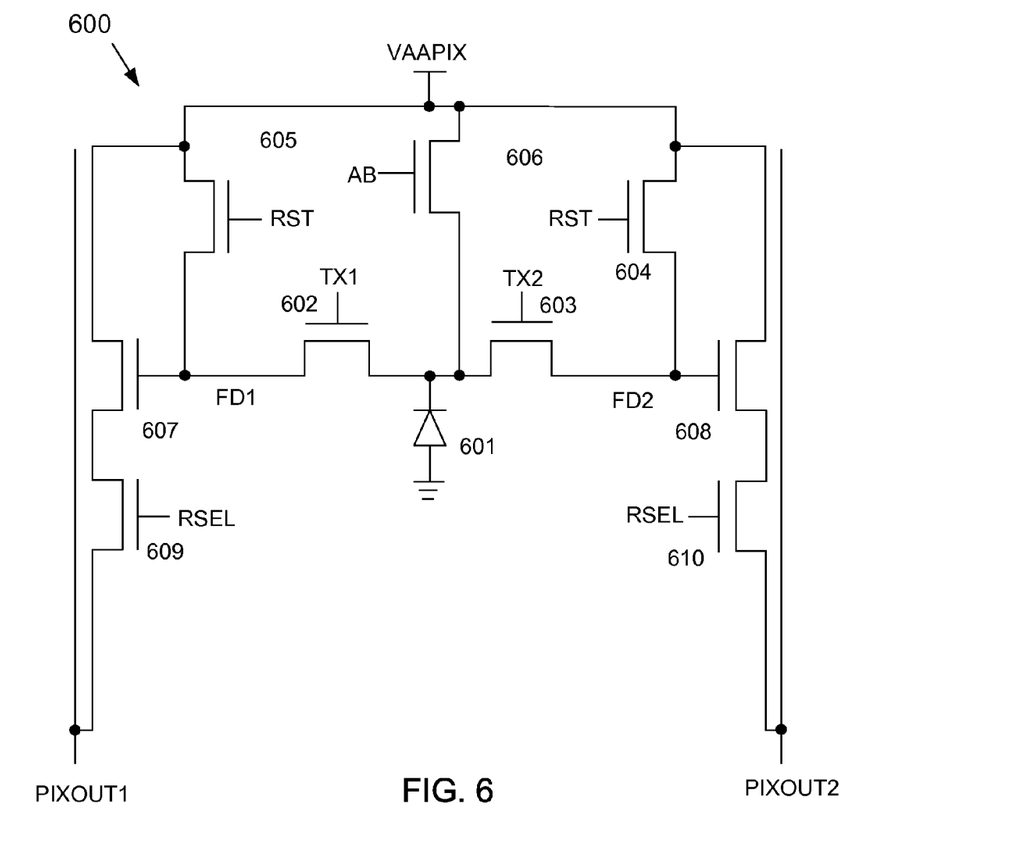
FIG. 6 depicts a schematic diagram of one exemplary embodiment of a pixel that may be used for epipolar plane, single-pulse, indirect TOF 3D-depth measurements according to the subject matter disclosed herein.
Figure 7:
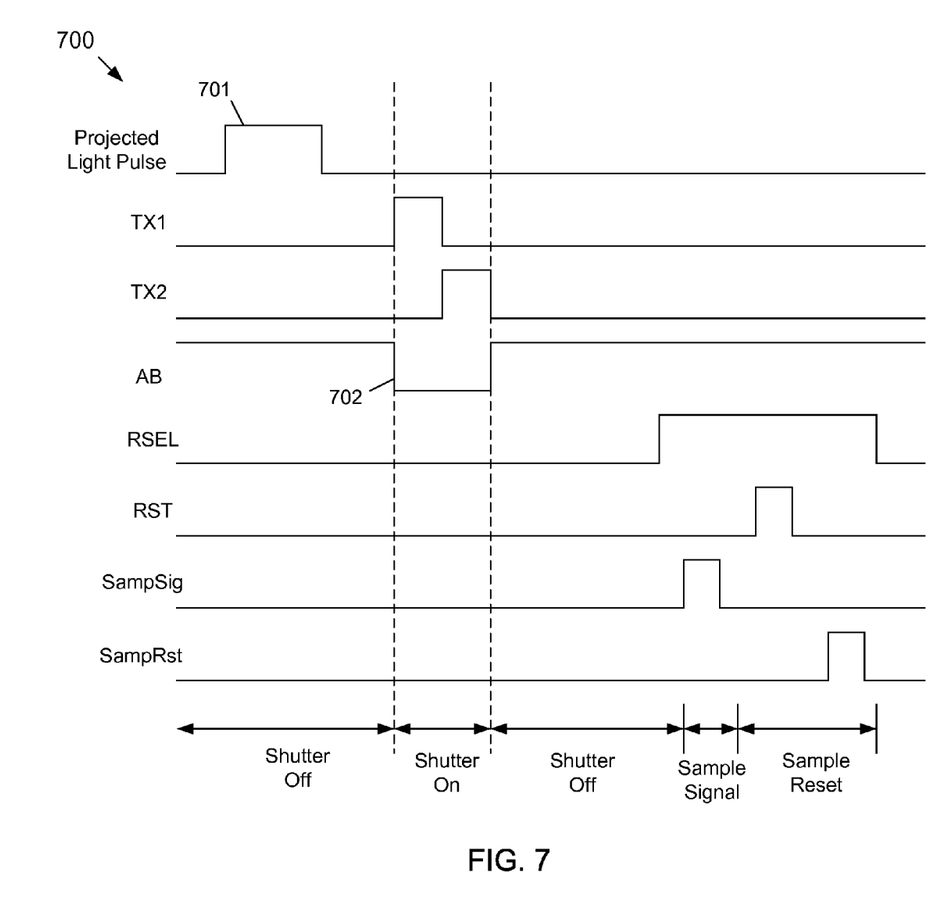
FIG. 7 depicts one embodiment of a timing diagram for operating the pixel depicted in FIG. 6 according to the subject matter disclosed herein.

FIG. 6 depicts a schematic diagram of one exemplary embodiment of a pixel 600 that may be used for epipolar plane, single-pulse, indirect TOF 3D-depth measurements according to the subject matter disclosed herein. FIG. 7 depicts one embodiment of a timing diagram 700 for operating the pixel 600 according to the subject matter disclosed herein.

Figure 9:
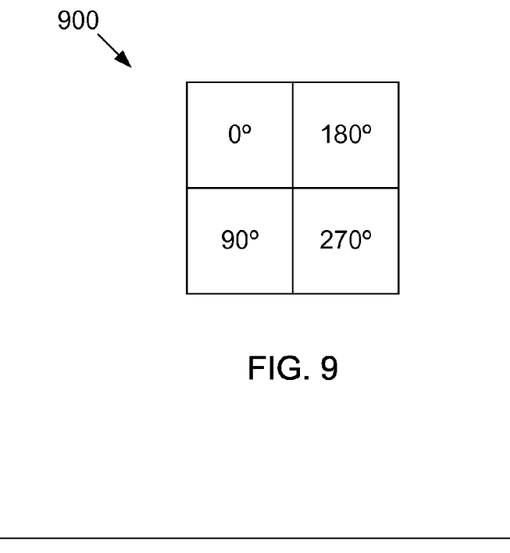
FIG. 9 depicts an exemplary arrangement of pixels to detect four signals of different phase during the same Measured Field period according to the subject matter disclosed herein.

In one exemplary embodiment, the pixel 600 comprises a pinned photodiode (PPD) 601, and nine N-channel Metal Oxide Semiconductor Field Effect Transistors (MOSFETs) 602-610 connected as illustrated. The transistors 602 and 603 operate as Transfer Gate (TG), Floating Diffusion (FD) transistors. With reference to FIG. 7, the pixel 600 may broadly operate as follows: A single light pulse (LP) is projected at 701. At 702, the pixel is gated on (enabled) by an antiblooming signal AB during a (selectable) shutter period (SP) (i.e., during the measurement field in FIG. 4) to detect a reflected light pulse (not shown), at which time the PPD 601 may convert incident photons into electrons, thereby converting the optical input signal into an electrical signal in the charge domain. During signal AB, the transfer gates 602 and 603 are respectively "closed" by active signals TX1 and TX2, which correspond to complementary demodulation signals. In one embodiment, two different AB signals are used depending on whether the pixel is a "0°" pixel or a "180°" pixel, or a "90°" or a "270°" pixel. FIG. 9 depicts four pixels that are arranged in two rows in which the pixels in the top row are "0°" and "180°" pixels and the pixels in the bottom row are "90°" and "270°" pixels. The AB signal for the "90°" and "270°" pixels lags the AB signal for the "0°" and "180°" pixels by 90° of the Pulse Cycle T of the Measured Field (FIG. 4). The photo-generated electrons are transferred from the PPD 601 to the floating diffusions FD1 and FD2 during active signals TX1 and TX2 to respectively convert the charge-domain signals to the voltage domain by transistors 607 and 608 for subsequent processing and measurements. At the end of the shutter period (SP), the signal AB becomes active and disables the pixel from detecting any further light signals. The signals TX1 and TX2 become inactive. A row select (RSEL) signal applied to transistors 609 and 610 respectively transfers the voltage-domain signals to PIXOUT1 and PIXOUT2. A sample signal (Sampsig) triggers an analog-to-digital converter (ADC) (not shown) to digitize the detected phase signals of the Returned Light pulse. A reset (RST) signal resets pixel 600 to a pre-determined high voltage level, and a sample reset (Samprst) resets the ADC.

FIG. 8 shows exemplary circuit details of the 2D pixel array 142 and a portion of the associated processing circuits in the image processing unit 146 of the image sensor 124 in FIGS. 1 and 2 according to one exemplary embodiment disclosed herein. The pixel array 142 is shown having six pixels 801-806 arranged as a 2×3 array for ease of illustration. In practice, however, a pixel array may contain hundreds of thousands or millions of pixels in multiple rows and columns. In one embodiment, each pixels 801-806 may have an identical configuration as shown in FIG. 8. In the embodiment of FIG. 8, the 2D pixel array 142 comprises a Complementary Metal Oxide Semiconductor (CMOS) array in which each pixel is a Nine Transistor Pinned Photodiode (9T PPD) pixel, such as pixel 600 depicted in FIG. 6. For ease of illustration, the constituent circuit elements of pixels 801-806 are not labeled with reference numerals, although signal names are shown.

In the embodiment of FIG. 8, a row decoder/driver 816 in the image processing unit 146 is shown to provide four different signals to control the operation of the pixels in the pixel array 142 to generate the column-specific pixout signals 817-822. A Row Select (RSEL) signal may be asserted to select an appropriate row of pixels. That is, the selected row forms an epipolar line of the scanning line of the light pulse being projected by the laser source 133. The row decoder/driver 816 may receive the address or control information for the selected row via the row address/control inputs 826 from, for example, the processor 119. For the present discussion, consider that the row decoder/driver 816 selects a single row of pixels containing, for example, the pixel 606 by outputting an appropriate Row Select (RSEL) signal. The row decoder driver 816 also outputs the appropriate phase detection signals for the selected row. That is, a Transfer1 (TX1) signal and a Transfer2 (TX2) signal may be asserted in accordance with the demodulation signals described herein to initiate transfer of the pixel-specific output voltages PIXOUT1 and PIXOUT2 for subsequent processing. A Reset (RST) signal may be applied to pixels in the selected row to reset the pixels to a pre-determined high voltage level. Each row-specific RST signal 828 and 829 is shown in FIG. 8.

As mentioned before, in particular embodiments disclosed herein, the 2D array 142 and the rest of the components in the image-sensor unit 124 may be used for 2D imaging as well as for 3D-depth measurements. Consequently, as shown in FIG. 8, the image-sensor unit 124 may include a pixel column unit 838 that includes circuits for Correlated Double Sampling (CDS) as well as column-specific ADCs—two ADCs per column of pixels—to be used during 3D imaging. The pixel column unit 838 may receive and process the PIXOUT signals 817-822 to generate a digital data output signal 840 from which a 3D-depth measurements can be obtained. The pixel column unit 838 may also receive reference inputs 842 during processing of the PIXOUT signals 817-822. In the embodiment of FIG. 8, a column decoder unit 845 is shown coupled to the pixel column unit 838. The column decoder 845 may receive a column address/control input 847 from, for example, the processor 119, for the column to be selected in conjunction with a given row select (RSEL) signal.

FIG. 9 depicts an exemplary arrangement of pixels 900 to detect four signals of different phase during the same Measured Field period according to the subject matter disclosed herein. As depicted in FIG. 9, pixels for detecting 0° and 180° phase signals are alternatingly arranged in a first row of pixels, and pixels for detecting 90° and 270° phase signals are alternatingly arranged in a second row of pixels. Although not depicted in FIG. 9, the exemplary arrangement of pixels 900 is repeated throughout the pixel array, for example, 2D pixel array 142. In another exemplary embodiment, the pixels depicted in the top row in FIG. 9 are disposed in the bottom row, and the pixels depicted in the bottom row of FIG. 9 are disposed in the top row. In yet another exemplary embodiment, the pixels depicted in the top row of FIG. 9 may be disposed in the first column of FIG. 9, and the pixels depicted in the bottom row of FIG. 9 may be disposed in the second column of FIG. 9. By detecting four different phases during the same Measured Field period, motion blur is reduced.

Figure 10:
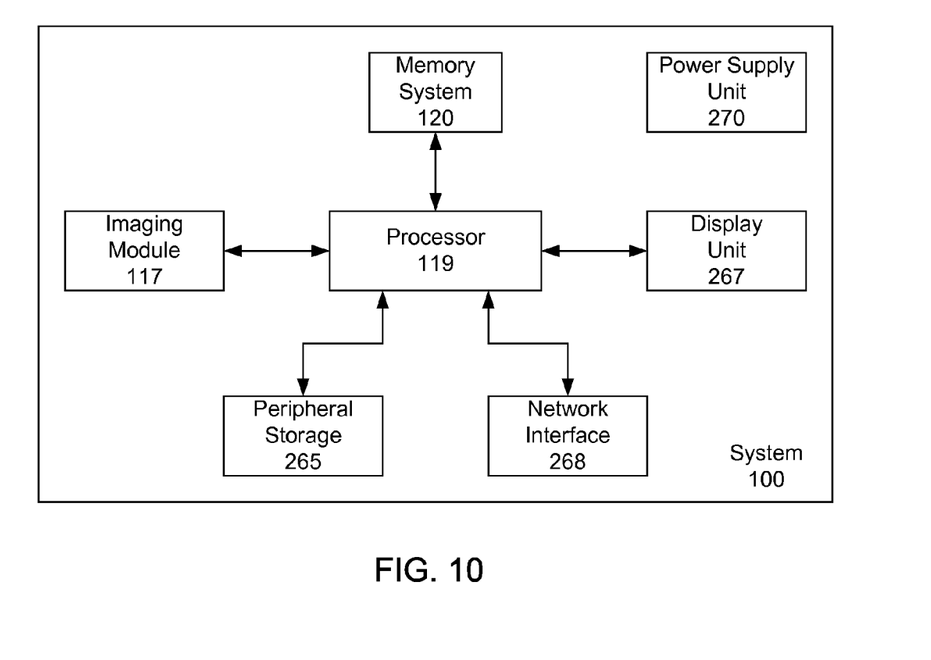
FIG. 10 depicts an overall configuration of the system in FIGS. 1 and 2 according to one embodiment disclosed herein.

FIG. 10 depicts an overall configuration of the system 100 in FIGS. 1 and 2 according to one embodiment disclosed herein. Hence, for ease of reference and discussion, the same reference numerals are used in FIGS. 1, 2 and 10 for the common system components/units.

As discussed earlier, the imaging module 117 may include the hardware shown in the exemplary embodiments of FIGS. 2, 8 and 9 to accomplish 3D-depth measurements as per the subject matter disclosed herein. The processor 119 may be configured to interface with a number of external devices. In one embodiment, the imaging module 117 may function as an input device that provides data inputs, that is, in the form of pixel event data to the processor 119 for further processing. The processor 119 may also receive inputs from other input devices (not shown) that may be part of the system 100. Some examples of such input devices include, but are not limited to, an inertial navigation sensor, a Global Navigation Satellite System (GNSS) receiver, a computer keyboard, a touchpad, a touch-screen, a joystick, a physical or virtual "clickable button," and/or a computer mouse/pointing device. In FIG. 10, the processor 119 is shown coupled to the system memory 120, a peripheral storage unit 265, one or more output devices 267, and a network interface unit 268. In FIG. 10, a display unit is shown as an output device 267. In some embodiments, the output device 267 may comprise a touchscreen display. In some embodiments, the system 100 may include more than one instance of the devices shown. Some examples of the system 100 include, but are not limited to, a vehicle such as an automobile or a truck, an aircraft, an air-borne platform, a watercraft, a rail-guided vehicle, a vehicle dash-cam or rearview camera system, a computer system (desktop or laptop), a tablet computer, a mobile device, a cellular phone, a video gaming unit or console, a machine-to-machine (M2M) communication unit, a robot, a virtual reality equipment, a stateless "thin" client system, or any other type of computing or data processing device. In various embodiments, all of the components shown in FIG. 10 may be housed within a single housing. Thus, the system 100 may be configured as a standalone system or in any other suitable form factor. In some embodiments, the system 100 may be configured as a client system rather than a server system.

In particular embodiments, the system 100 may include more than one processor (e.g., in a distributed processing configuration). If the system 100 is a multiprocessor system, there may be more than one instance of the processor 119 or there may be multiple processors coupled to the processor 119 via their respective interfaces (not shown). The processor 119 may be a System on Chip (SoC) and/or may include more than one Central Processing Unit (CPU).

As mentioned earlier, the system memory 120 may be any semiconductor-based storage system such as, but not limited to, DRAM, SRAM, PRAM, RRAM, CBRAM, MRAM, STT-MRAM, and the like. In some embodiments, the memory unit 120 may include at least one 3DS memory module in conjunction with one or more non-3DS memory modules. The non-3DS memory may include Double Data Rate or Double Data Rate 2, 3 or 4 Synchronous Dynamic Random Access Memory (DDR/DDR2/DDR3/DDR4 SDRAM), or Rambus® DRAM, flash memory, various types of Read Only Memory (ROM), etc. Also, in some embodiments, the system memory 120 may include multiple different types of semiconductor memories, as opposed to a single type of memory. In other embodiments, the system memory 120 may be a non-transitory data storage medium The peripheral storage unit 265, in various embodiments, may include support for magnetic, optical, magneto-optical, or solid-state storage media, such as hard drives, optical disks (such as Compact Disks (CDs) or Digital Versatile Disks (DVDs)), non-volatile Random Access Memory (RAM) devices, and the like. In some embodiments, the peripheral storage unit 265 may include more complex storage devices/systems, such as disk arrays (which may be in a suitable RAID (Redundant Array of Independent Disks) configuration) or Storage Area Networks (SANs), and the peripheral storage unit 265 may be coupled to the processor 119 via a standard peripheral interface, such as a Small Computer System Interface (SCSI) interface, a Fibre Channel interface, a Firewire® (IEEE 1394) interface, a Peripheral Component Interface Express (PCI Express™) standard based interface, a Universal Serial Bus (USB) protocol based interface, or another suitable interface. Various such storage devices may be non-transitory data storage media.

The display unit 267 may be an example of an output device. Other examples of an output device include, but are not limited to, a graphics/display device, a computer screen, an alarm system, a CAD/CAM (Computer Aided Design/Computer Aided Machining) system, a video game station, a smartphone display screen, or any other type of data output device. In some embodiments, the input device(s), such as the imaging module 117, and the output device(s), such as the display unit 267, may be coupled to the processor 119 via an I/O or peripheral interface(s).

In one embodiment, the network interface 268 may communicate with the processor 119 to enable the system 100 to couple to a network (not shown). In another embodiment, the network interface 268 may be absent altogether. The network interface 268 may include any suitable devices, media and/or protocol content for connecting the system 100 to a network, whether wired or wireless. In various embodiments, the network may include Local Area Networks (LANs), Wide Area Networks (WANs), wired or wireless Ethernet, telecommunication networks, or other suitable types of networks.

The system 100 may include an on-board power supply unit 270 to provide electrical power to various system components illustrated in FIG. 10. The power supply unit 270 may receive batteries or may be connectable to an AC electrical power outlet. In one embodiment, the power supply unit 270 may convert solar energy into electrical power.

In one embodiment, the imaging module 117 may be integrated with a high-speed interface such as, but not limited to, a Universal Serial Bus 2.0 or 3.0 (USB 2.0 or 3.0) interface or above, that plugs into any Personal Computer (PC) or laptop. A non-transitory, computer-readable data storage medium, such as, but not limited to, the system memory 120 or a peripheral data storage unit, such as a CD/DVD may store program code or software. The processor 119 in the imaging module 117 may be configured to execute the program code, whereby the device 100 may be operative to perform the 3D-depth measurements as discussed hereinbefore, such as the operations discussed earlier with reference to FIGS. 1-9. The program code or software may be proprietary software or open source software which, upon execution by the appropriate processing entity, such as the processor 119 may enable the processing entity to capture pixel events using their precise timing, process them, render them in a variety of formats, and display them in the 3D formats.

In the preceding description, for purposes of explanation and not limitation, specific details are set forth (such as particular architectures, waveforms, interfaces, techniques, etc.) in order to provide a thorough understanding of the disclosed technology. It will be apparent, however, to those skilled in the art that the disclosed technology may be practiced in other embodiments that depart from these specific details. That is, those skilled in the art will be able to devise various arrangements which, although not explicitly described or shown herein, embody the principles of the disclosed technology. In some instances, detailed descriptions of well-known devices, circuits, and methods are omitted not to obscure the description of the disclosed technology with unnecessary detail. All statements herein reciting principles, aspects, and embodiments of the disclosed technology, as well as specific examples thereof, are intended to encompass both structural and functional equivalents thereof. Additionally, it is intended that such equivalents include both currently known equivalents as well as equivalents developed in the future, such as any elements developed that perform the same function, regardless of structure.

Thus, for example, it will be appreciated by those skilled in the art that block diagrams herein (e.g., in FIGS. 1 and 2) can represent conceptual views of illustrative circuitry or other functional units embodying the principles of the technology. Similarly, it will be appreciated that the flow chart in FIG. 3 represents various processes which may be substantially performed by a processor (e.g., the processor 119 in FIG. 10). Such processor may include, by way of example, a general-purpose processor, a special-purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the functionalities described above in the context of FIGS. 1-9 also may be provided by such processor, in the hardware and/or software.

If certain aspects of the subject matter disclosed herein require software-based processing, such software or program code may reside in a computer-readable data-storage medium. As noted earlier, such data storage medium may be part of the peripheral storage unit 265 or may be part of the system memory 120 or the internal memory (not shown) of processor 119. In one embodiment, the processor 119 may execute instructions stored on such a medium to carry out the software-based processing. The computer-readable data storage medium may be a non-transitory data-storage medium containing a computer program, software, firmware, or microcode for execution by a general-purpose computer or a processor mentioned above. Examples of computer-readable storage media include, but are not limited to, a ROM, a RAM, a digital register, a cache memory, semiconductor memory devices, magnetic media, such as internal hard disks, magnetic tapes and removable disks, magneto-optical media, and optical media, such as CD-ROM disks and DVDs.

Alternative embodiments of the imaging module 117 or the system 100 comprising such an imaging module according to aspects of the subject matter disclosed herein may include additional components responsible for providing additional functionality, including any of the functionality identified above and/or any functionality necessary to support the solution as per the subject matter disclosed herein. Although features and elements are described above in particular combinations, each feature or element can be used alone without the other features and elements or in various combinations with or without other features. As mentioned before, various 3D-imaging functions discussed herein may be provided through the use of hardware (such as circuit hardware) and/or hardware capable of executing software/firmware in the form of coded instructions or microcode stored on a computer-readable data-storage medium (mentioned above). Thus, such functions and illustrated functional blocks are to be understood as being hardware-implemented and/or computer-implemented, and thus machine-implemented.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A method of detecting an image, comprising:
enabling for a first predetermined period of time detection of light reflected from at least one object illuminated by a first light pulse by a first row of pixels of a two-dimensional (2D) pixel array, the first row of pixels forming an epipolar line of a scanning line of the first light pulse, the first light pulse comprising a pulse cycle T and a leading edge of the first light pulse comprising a beginning of the pulse cycle T of the first light pulse, the enabling of detection by the first row of pixels for the first predetermined period of time occurring a second predetermined period of time after the beginning of the pulse cycle T of the first light pulse, and the first predetermined period of time being substantially equal to the pulse cycle T of the first light pulse; and
enabling for the first predetermined period of time detection of light reflected from the at least one object illuminated by a second light pulse by a second row of pixels of the 2D pixel array, the second row of pixels forming an epipolar line of a scanning line of the second light pulse, the second row of pixels being different from the first row of pixels, the second light pulse comprising the pulse cycle T and a leading edge of the second light pulse comprising a beginning of the pulse cycle T of the second light pulse, the enabling of detection by the second row of pixels for the first predetermined period of time occurring the second predetermined period of time after the beginning of the pulse cycle T of the second light pulse, and the first predetermined period of time being substantially equal to the pulse cycle T of the second light pulse; and wherein the beginning of the pulse cycle T of the second light pulse occurs after an end of the first predetermined period of time of the detection of the light reflected from the at least one object illuminated by the first light pulse.

2. The method according to claim 1, wherein the second predetermined period of time is selectably variable.

3. The method according to claim 1, further comprising:
generating detection signals corresponding to the detected light reflected from the at least one object illuminated by the first light pulse; and
generating detection signals corresponding to the detected light reflected from at the least one object illuminated by the second light pulse.

4. The method according to claim 3, further comprising:
generating depth information based on the generated detection signals corresponding to the detected light reflected from the at least one object illuminated by the first light pulse; and
generating depth information based on the generated detection signals corresponding to the detected light reflected from the at least one object illuminated by the second light pulse.

5. The method according to claim 1, wherein the enabling for the first predetermined period of time the detection of the light reflected from the at least one object illuminated by the first light pulse further comprises:
enabling for the first predetermined period of time the detection of the light reflected from the at least one object illuminated by the first light pulse by the first row of pixels, the enabling of the detection of the light reflected from the at least one object illuminated by the first light pulse occurring the second predetermined period of time after the beginning of the pulse cycle T of the first light pulse; and
enabling for the first predetermined period of time detection of light reflected from at least one object illuminated by a third light pulse by the first row of pixels, the third light pulse comprising the pulse cycle T and a leading edge of the third light pulse comprising a beginning of the pulse cycle T of the third light pulse, the enabling of the detection of the light reflected from the at least one object illuminated by the third light pulse occurring the second predetermined period of time after the beginning of the pulse cycle T of the third light pulse, and the beginning of the pulse cycle T of the third light pulse occurring after an end of the first predetermined period of time of the detection of the light reflected from the at least one object illuminated by the first light pulse, and
wherein enabling for the first predetermined period of time the detection of the light reflected from the at least one object illuminated by the second light pulse further comprises:
enabling for the first predetermined period of time the detection of the light reflected from the at least one object illuminated by the second light pulse by the second row of pixels, the enabling of the detection of the light reflected from the at least one object illuminated by the second light pulse occurring the second predetermined period of time after the beginning of the pulse cycle T of the second light pulse; and
enabling for the first predetermined period of time detection of light reflected from the at least one object illuminated by a fourth light pulse by the second row of pixels, the fourth light pulse comprising the pulse cycle T and a leading edge of the fourth light pulse comprising a beginning of the pulse cycle T of the fourth light pulse, the enabling of the detection of the light reflected from the at least one object illuminated by the fourth light pulse occurring the second predetermined period of time after the beginning of the pulse cycle T of the fourth light pulse, and the beginning of the pulse cycle T of the fourth light pulse occurring after an end of the first predetermined period of time of the detection of the light reflected from the at least one object illuminated by the second light pulse.

6. The method according to claim 1, further comprising repeating the method of claim 1 for a predetermined number of rows of the 2D pixel array,
wherein the predetermined number of rows is less than or equal to a total number of rows of the 2D pixel array.

7. The method according to claim 1, wherein at least one of the first row and the second row of pixels comprises a plurality of rows that forms the epipolar line of the scanning line of a corresponding light pulse.

8. An image sensor unit, comprising:
a two-dimensional (2D) pixel array comprising a plurality of rows of pixels; and
a controller to enable for a first predetermined period of time detection of light reflected from at least one object illuminated by a first light pulse by a first row of pixels of the 2D pixel array, the first row of pixels forming an epipolar line of a scanning line of the first light pulse, the first light pulse comprising a pulse cycle T and a leading edge of the first light pulse comprising a beginning of the pulse cycle T of the first light pulse, the enabling of the detection by the first row of pixels for the first predetermined period of time occurring a second predetermined period of time after the beginning of the pulse cycle T of the first light pulse, the first period of time being substantially equal to the pulse cycle T of the first light pulse, and to enable for the first predetermined period of time detection of light reflected from the at least one object illuminated by a second light pulse by a second row of pixels of the 2D pixel array, the second row of pixels forming an epipolar line of a scanning line of the second light pulse, the second row of pixels being different from the first row of pixels, the second light pulse comprising the pulse cycle T and a leading edge of the second light pulse comprising a beginning of the pulse cycle T of the second light pulse, the enabling of detection by the second row of pixels for the first predetermined period of time occurring the second predetermined period of time after the beginning of the pulse cycle T of the second light pulse, and the first period of time being substantially equal to the pulse cycle T of the second light pulse; and
wherein the beginning of the pulse cycle T of the second light pulse occurs after an end of the first predetermined period of time of detection of light reflected from the at least one object illuminated by the first light pulse.

9. The image sensor according to claim 8, wherein the second predetermined period of time is selectably variable.

10. The image sensor according to claim 8, wherein the controller is further to enable generation of detection signals corresponding to the detected light reflected from the at least one object illuminated by the first light pulse; and to enable generation of detection signals corresponding to the detected light reflected from at the least one object illuminated by the second light pulse.

11. The image sensor according to claim 10, wherein the controller is further to enable generation of depth information based on the generated detection signals corresponding to the detected light reflected from the at least one object illuminated by the first light pulse; and generation of depth information based on the generated detection signals corresponding to the detected light reflected from the at least one object illuminated by the second light pulse.

12. The image sensor according to claim 8, wherein the controller is further to:
enable for the first predetermined period of time detection of the light reflected from the at least one object illuminated by a third light pulse by the first row of pixels, the third light pulse comprising the pulse cycle T and a leading edge of the third light pulse comprising a beginning of the pulse cycle T of the third light pulse, the enabling of detection of light reflected from the at least one object illuminated by the third light pulse occurring the second predetermined period of time after a beginning of the pulse cycle T of the third light pulse, and the beginning of the pulse cycle T of the third light pulse occurring after an end of the first predetermined period of time detection of light reflected from the at least one object illuminated by the first light pulse; and
enable for the first predetermined period of time detection of the light reflected from the at least one object illuminated by a fourth light pulse by the second row of pixels, the fourth light pulse comprising the pulse cycle T and a leading edge of the fourth light pulse comprising a beginning of the pulse cycle T of the fourth light pulse, the enabling of detection of light reflected from the at least one object illuminated by the fourth light pulse occurring the second predetermined period of time after the beginning of the pulse cycle T of the fourth light pulse, and the beginning of the pulse cycle T of the fourth light pulse occurring after an end of the first predetermined period of time detection of light reflected from the at least one object illuminated by the second light pulse.

13. An image sensor unit, comprising:
a two-dimensional (2D) pixel array comprising a plurality of rows of pixels; and
a controller to enable for a first predetermined period of time detection of light reflected from of at least one object illuminated by a first light pulse at a first row of pixels of the 2D pixel array, the first row of pixels forming an epipolar line of a scanning line of the first light pulse, the first light pulse comprising a pulse cycle T and a leading edge of the first light pulse comprising a beginning of the pulse cycle T, the enabling of the detection by the first row of pixels for the first predetermined period of time occurring a second predetermined period of time after the beginning of the pulse cycle T of the first light pulse, the first period of time being substantially equal to the pulse cycle T, and during the first predetermined period of time to enable generation of a plurality of phase signals corresponding to the detected light reflected from the at least one object illuminated by the first light pulse; and
wherein the controller is further to enable for the first predetermined period of time the detection of the light reflected from the at least one object illuminated by a third light pulse by the first row of pixels, the enabling of the detection of the light reflected from the at least one object illuminated by the third light pulse occurring the second predetermined period of time after a beginning of the pulse cycle T of the third light pulse, and the beginning of the pulse cycle T of the third light pulse occurring after an end of the first predetermined period of time of detection of light reflected from the at least one object illuminated by the first light pulse.

14. The image sensor unit according to claim 13, wherein the second predetermined period of time is selectably variable.

15. The image sensor unit according to claim 13, wherein the first row of pixels comprises a plurality of rows that forms the epipolar line of the scanning line of the corresponding light pulse.

16. The image sensor unit according to claim 13, wherein the controller is further to enable for the first predetermined period of time detection of light reflected from at least one object illuminated by a second light pulse by a second row of pixels of the 2D pixel array, the second row of pixels forming an epipolar line of a scanning line of the second light pulse, the second row of pixels being different from the first row of pixels, the second light pulse comprising the pulse cycle T, and the enablement of detection by the second row of pixels for the first predetermined period of time occurring the second predetermined period of time after a beginning of the pulse cycle T of the second light pulse, and to enable generation of phase signals corresponding to the detected light reflected from the at least one object illuminated by the second light pulse.

17. The image sensor according to claim 16, wherein the controller is further to enable for the first predetermined period of time detection of light reflected from at least one object illuminated by a fourth light pulse by the second row of pixels, the enabling of the detection of the light reflected from the at least one object illuminated by the fourth light pulse occurring the second predetermined period of time after a beginning of the pulse cycle T of the fourth light pulse, and the beginning of the pulse cycle T of the fourth light pulse occurring after an end of the first predetermined period of time of the detection of the light reflected from the at least one object illuminated by the second light pulse.

* * * * *